United States Patent
Hui et al.

(10) Patent No.: US 9,312,918 B2
(45) Date of Patent: Apr. 12, 2016

(54) PHASE SELECTION FOR POWER LINE COMMUNICATION (PLC) LINKS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/155,902

(22) Filed: Jan. 15, 2014

(65) Prior Publication Data

US 2015/0200714 A1    Jul. 16, 2015

(51) Int. Cl.
*H04B 3/00*  (2006.01)
*H04L 25/00* (2006.01)
*H04B 3/54*  (2006.01)

(52) U.S. Cl.
CPC ....................... *H04B 3/544* (2013.01)

(58) Field of Classification Search
CPC ......................................... H04B 3/544
USPC ........................................... 375/257
See application file for complete search history.

(56) References Cited

U.S. PATENT DOCUMENTS

| | | |
|---|---|---|
| 5,128,666 A | 7/1992 | Munier et al. |
| 5,822,383 A | 10/1998 | Muntz et al. |
| 6,549,046 B1 | 4/2003 | Klecka, III |
| 2002/0175702 A1 | 11/2002 | Cohen |
| 2007/0242602 A1 | 10/2007 | Pang et al. |
| 2010/0026151 A1* | 2/2010 | Melkumyan et al. .... 312/249.11 |
| 2013/0093601 A1* | 4/2013 | Ree .......................... 340/870.02 |

\* cited by examiner

*Primary Examiner* — Tanmay Shah
(74) *Attorney, Agent, or Firm* — Parker Ibrahim & Berg LLC; James M. Bemke; Stephen D. LeBarron (57) ABSTRACT

In one embodiment, a device receives connected phase data from a neighboring device indicative of one or more electrical phases to which the neighboring device is connected. A determination is made, based on the connected phase data for the neighboring device, whether to transmit the message to the neighboring device over a single electrical phase at a higher output power or over a plurality of electrical phases at a lower output power. The message is then transmitted to the neighboring device over the determined one or more electrical phases.

19 Claims, 12 Drawing Sheets

PHASE SELECTION FOR POWER LINE COMMUNICATION (PLC) LINKS

TECHNICAL FIELD

The present disclosure relates generally to power line communication (PLC) networks, and, more particularly, to dynamically selecting one or more electrical phases for communication over a PLC network.

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

Shared-media communication networks, such as power-line communication (PLC) networks (a type of communication over power-lines), provide an enabling technology for networking communication and can be used for example in advanced metering infrastructure (AMI) networks, and are also useful within home and buildings. The transfer of alternating-current (AC) electric power to the end users in such networks most frequently takes the form of three-phase electric power, where three current waveforms are produced that are generally equal in magnitude and 120° out of phase to each other. A device connected to all three phases, such as a field area router (FAR), may utilize all three phases for purposes of communication, allowing for greater data transmission rates. Current techniques for communicating in multi-phase PLC networks, however, offer room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives connected phase data from a neighboring device indicative of one or more electrical phases to which the neighboring device is connected. A determination is made, based on the connected phase data for the neighboring device, whether to transmit the message to the neighboring device over a single electrical phase at a higher output power or over a plurality of electrical phases at a lower output power. The message is then transmitted to the neighboring device over the determined one or more electrical phases.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, in particular, are a specific type of network having spatially distributed autonomous devices such as sensors, actuators, etc. For example, sensor networks, such as for "Smart Grid" and "Smart Cities" (e.g., for Advanced Metering Infrastructure or "AMI" applications), may cooperatively monitor physical or environmental conditions at different locations, such as, e.g., energy/power consumption, resource consumption, etc. Another type of smart object includes actuators, e.g., responsible for turning on/off an engine or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices.

That is, smart object networks are typically interconnected by a communication network, such as a wireless network, though wired connections are also available, and may often consist of wireless nodes in communication within a field area network (FAN). For instance, each smart device (node) in a smart object network may generally be equipped with a radio transceiver or other communication port, a microcontroller, and an energy source, such as a battery (or, in particular to the embodiments herein, a distribution grid power source). Typically, size and cost constraints on sensor nodes result in corresponding constraints on resources such as energy, memory, computational power and bandwidth. Correspondingly, a reactive routing protocol may, though need not, be used in place of a proactive routing protocol for sensor networks.

Figure 1:
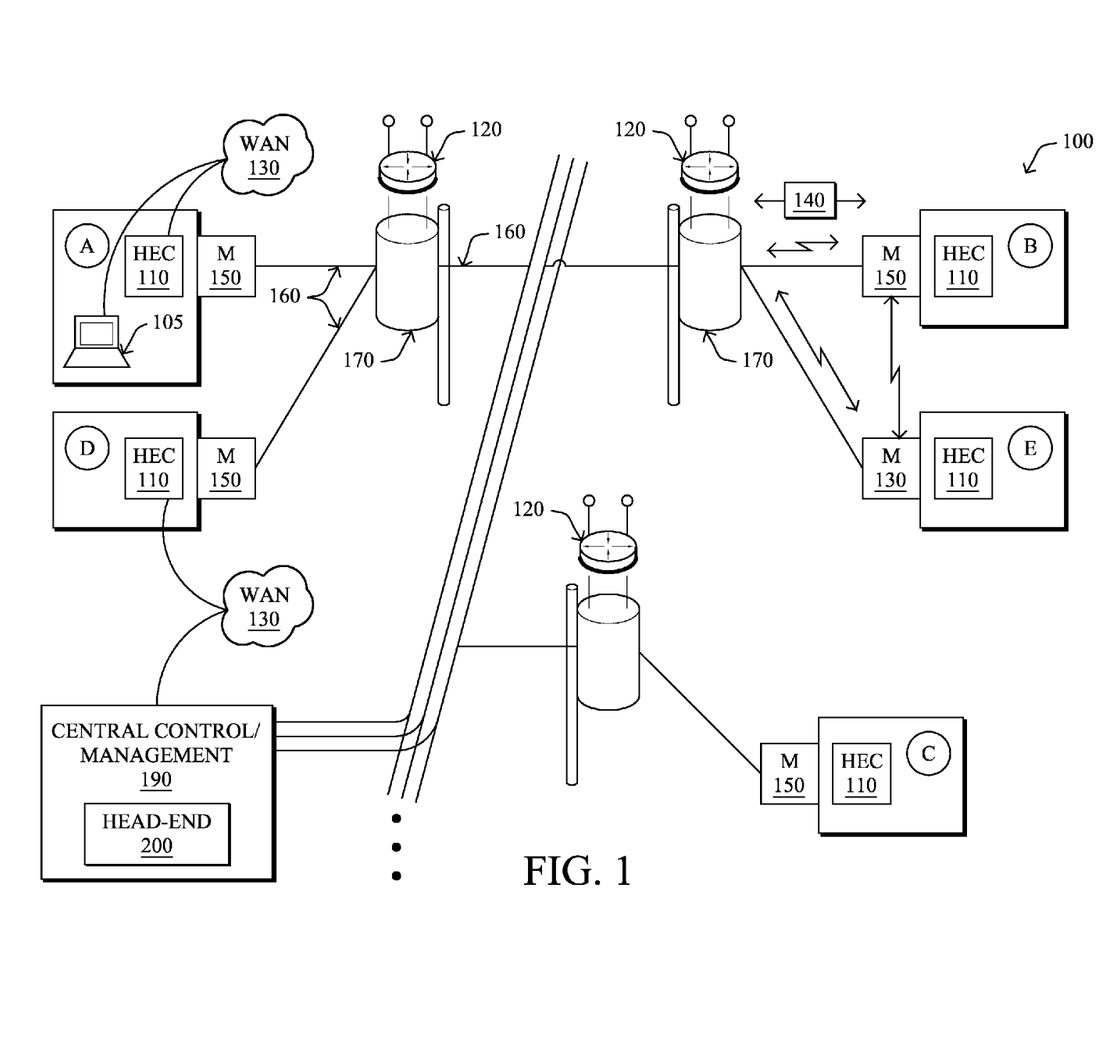
FIG. 1 illustrates an example network of devices shown with various communication and powering configurations.

FIG. 1 is a schematic block diagram of an example simplified network 100 of devices illustratively comprising various communicating and non-communicating devices. For example, power-lines 160 may bring electrical grid power from respective transformers 170 into homes/businesses/etc., generally via a meter 150. In addition, "pole-top" routers 120 may communicate data packets 140 (e.g., traffic and/or messages) with other communicating nodes/devices of the network 100. For instance, the links between the devices may be wired links (e.g., for power-line communication) or may comprise a wireless communication medium. A home energy controller (HEC) 110 or other energy controller may be present at certain locations, and may be in communication with the meters 150, pole-top routers 120, or else directly to another computer network, e.g., WAN 130, similar to conventional computers 105. In addition, a centralized control center or management center 190 may be present in the network 100, such as at an electrical grid company's centralized location, and may be in communication over power-lines 160 and through WAN 130.

Those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

Figure 2:
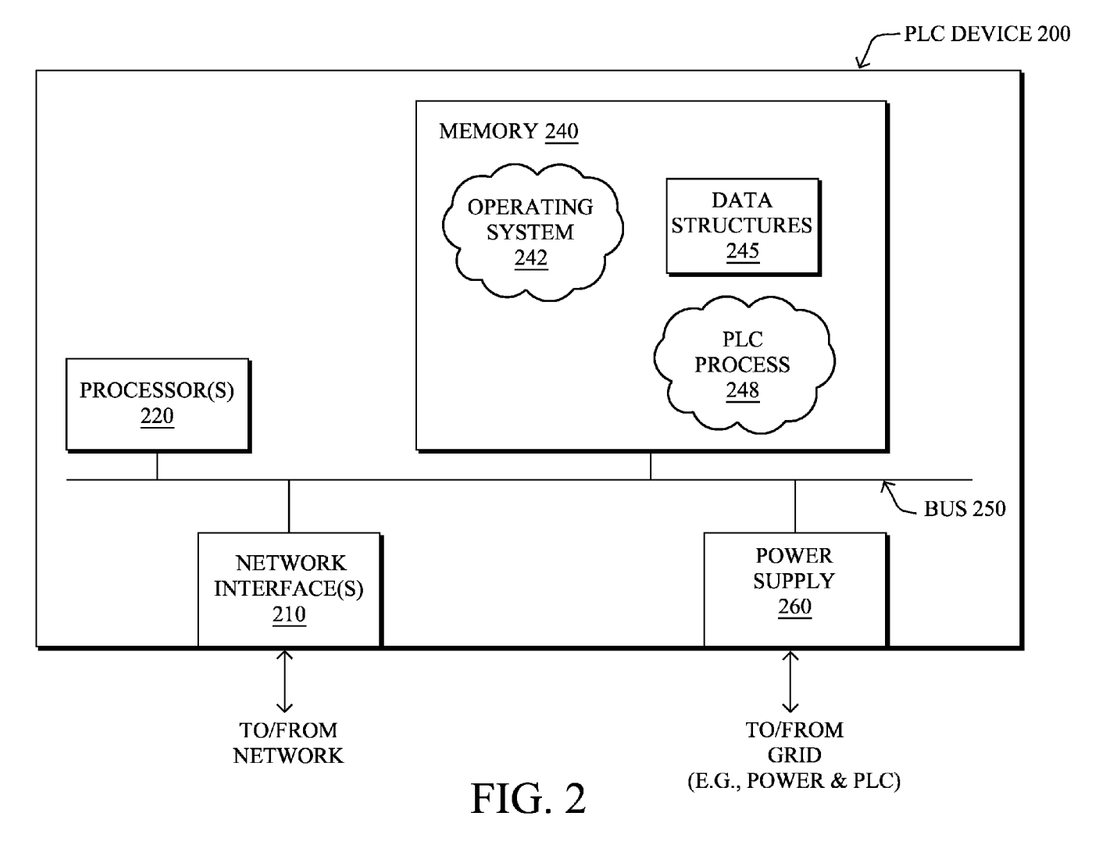
FIG. 2 illustrates an example device/node.

FIG. 2 is a schematic block diagram of an example PLC node/device 200 that may be used with one or more embodiments described herein. For example, PLC device 200 may correspond to a router 120 or smart meter 150 shown in FIG. 1, or another such device configured to communicate in network 100 using a PLC protocol. The device 200 may comprise, as a simple representation, a network interface 210, a processor 220, and a memory 240 interconnected by a system bus 250. Notably, PLC device 200 may also be powered by a power supply 260, such as a battery, a "plug-in" power supply, and/or a power supply that receives electric power from a power grid. For example, if PLC device 200 is a pole-top router, PLC device 200 may be powered directly by the power lines supported by the pole.

The network interface 210 contains the mechanical, electrical, and signaling circuitry for communicating data over physical and/or wireless links coupled to the network 100. The network interface may be configured to transmit and/or receive data using a variety of different communication protocols, including, inter alia, various wired or wireless protocols, powerline communication (PLC) protocols, broadband over power lines (BPL), etc. In cases in which device 200 is connected to multiple electrical phases in the power grid, network interface 210 may be configured to communicate over any or all of the connected phases using a PLC protocol. In one embodiment, network interface 210 comprises a single front-end that is multiplexed across the different electrical phases. In another embodiment, network interface 210 comprises separate front-end modules for each connected electrical phase.

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. As shown, for example, operating system 242 may invoke a PLC process 248 to handle the reception and/or transmission of PLC messages from other devices on the network. Note that although the PLC process 248 is shown within central memory 240, certain embodiments provide for the PLC process 248 to be a part of the network interfaces 210, and the embodiment shown is not meant to limit the techniques herein.

As noted above, electric power is generally transmitted from generation plants to end users (industries, commercial, residential, etc.) via a transmission grid consisting of a network of power stations, transmission circuits, and substations interconnected by power lines. From the transmission grid, power may then be distributed to end users via a distribution system. Once at the end users, electricity can be used to power any number of devices, such as end-point devices. The transmission and distribution of alternating-current (AC) electric power to the end users most frequently takes the form of polyphase electric power, a common form of which being three-phase electric power. For smaller customers (e.g., households) usually a single phase is taken to the property. For larger installations (large houses, buildings), all three phases may be taken to a distribution panel, from which both single and multi (two or three-phase) circuits may be fed.

Figure 3:
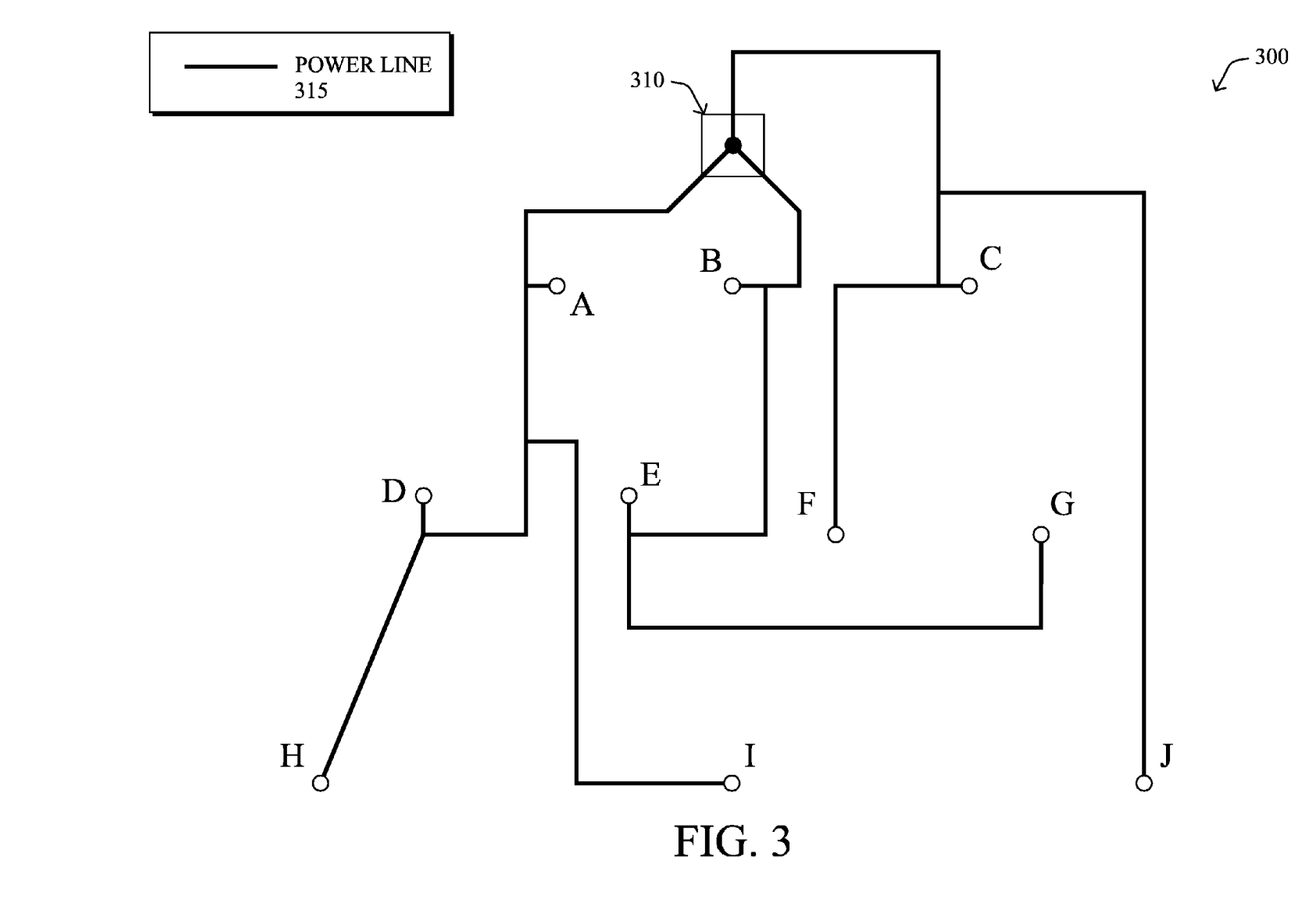
FIG. 3 illustrates an example electric power distribution system.

FIG. 3 illustrates a vastly simplified view of an example electric power transmission and distribution grid 300 to the example devices of FIG. 1, above. For instance, a distribution center 310 supplies electricity over a plurality of power lines 315 (e.g., power-lines 160) to the devices at locations "A" through "J".

Figure 4:
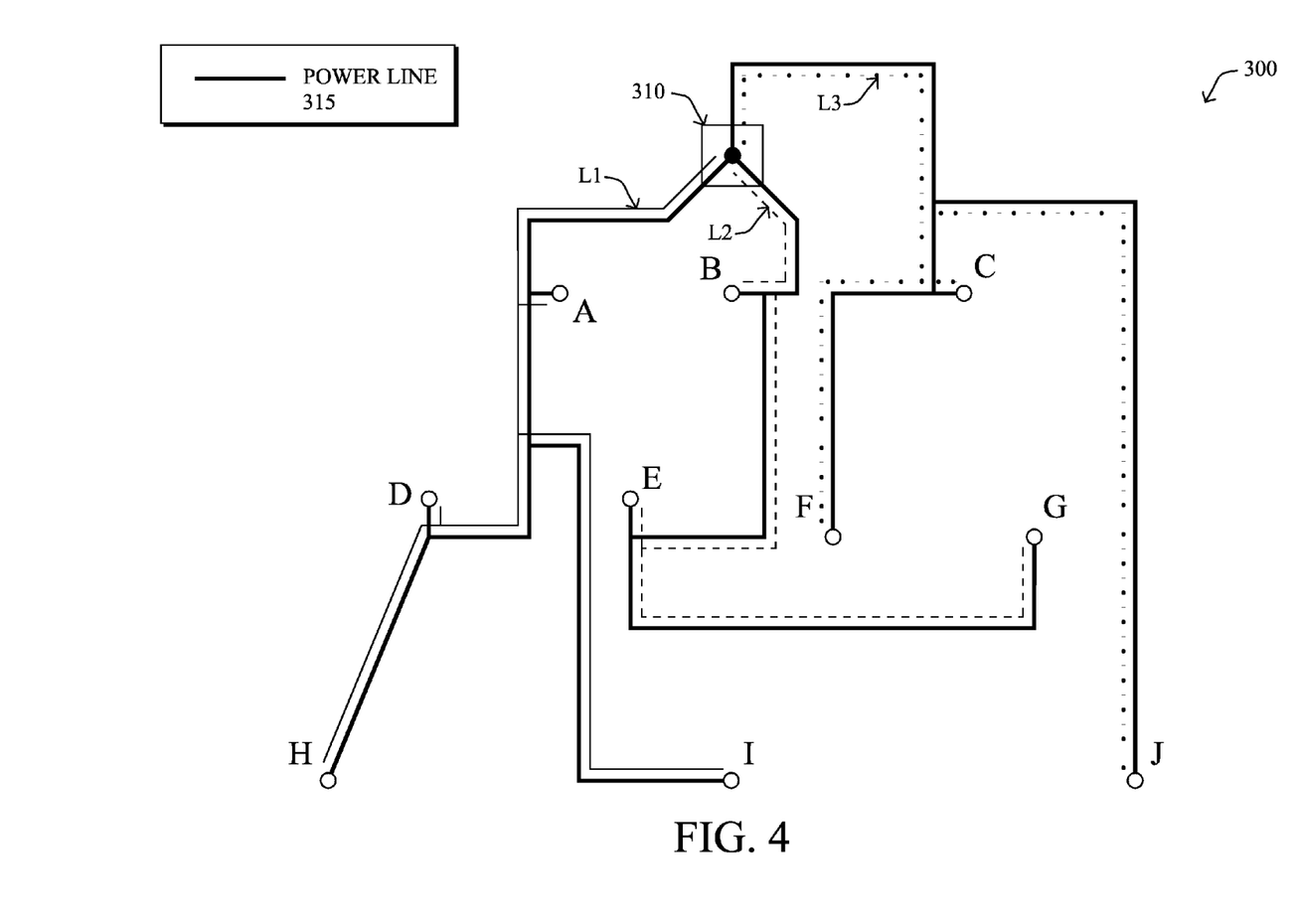
FIG. 4 illustrates an example polyphase electric power distribution of the system shown in FIG. 3.

In the embodiments herein, the supplied electricity is part of a polyphase source system, where a plurality of phases (e.g., three) are transmitted onto the lines 315 to the devices, such that each device is generally attached to a particular phase of the electric grid. As shown in FIG. 4, therefore, electrical power of three phases, L1, L2, and L3, is supplied to the locations A-J (a neutral/ground may be shared by the phases). Notably, as mentioned above, the view shown herein is vastly simplified, as each phase may generally be used to power entire buildings, neighborhoods, etc., and may also supply power to many (e.g., tens, hundreds, thousands) of devices within those establishments. Also, while the view shown herein is generally arbitrarily connected, phase-based distribution grid topologies generally result in "clusters" of like-phased devices (e.g., those within the buildings, neighborhoods, etc.).

Figure 5A:
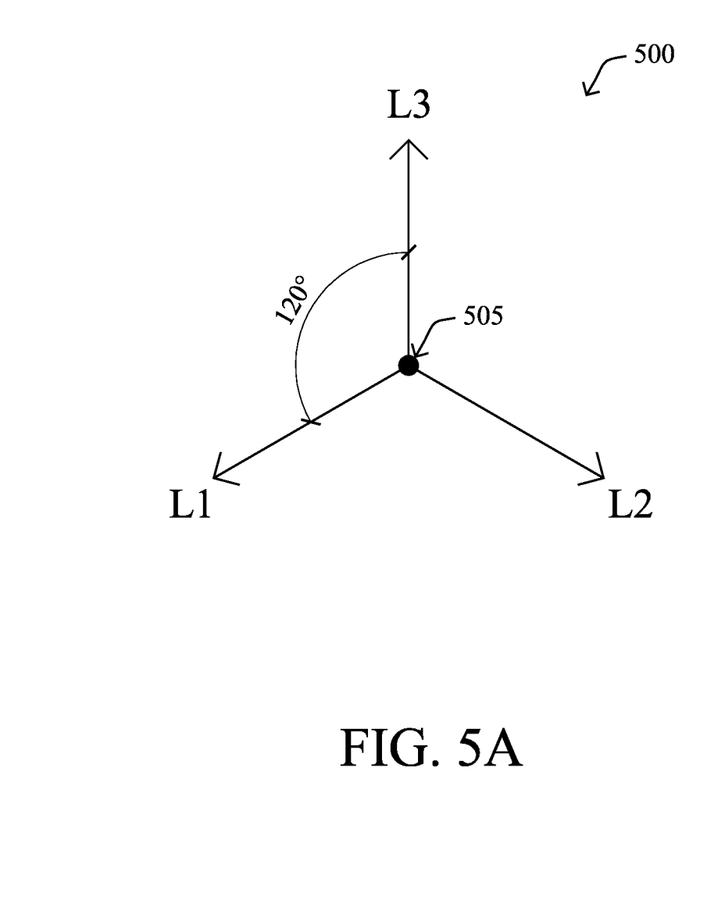
FIGS. 5A-B illustrate example phase representations of the polyphase electric power distribution system shown in FIGS. 3-4.
Figure 5B:
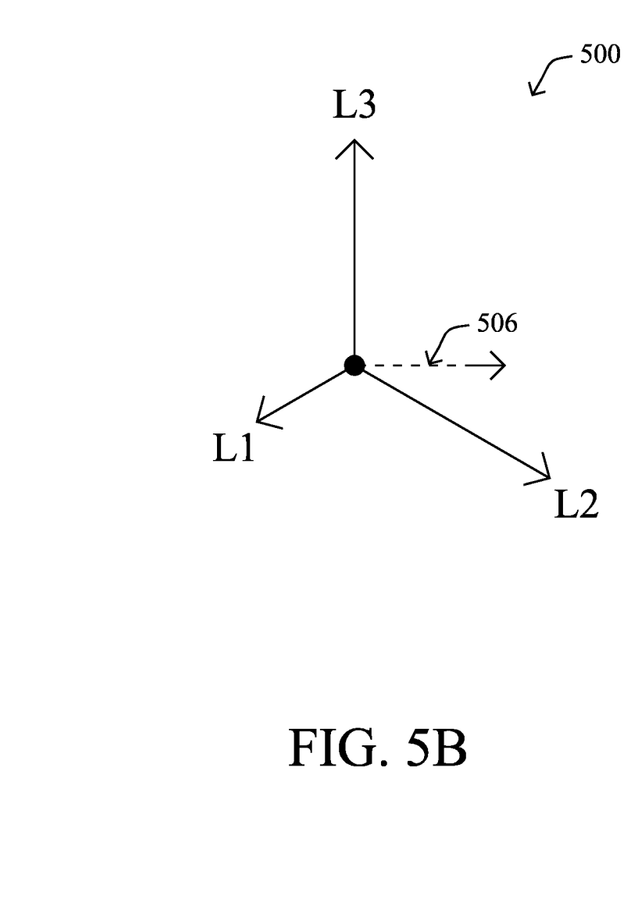

FIG. 5A illustrates an example phase representation 500 of the distribution grid's electrical power. In particular, three current waveforms are illustratively produced (L1, L2, and L3) that are generally equal in magnitude and 120° out of phase to each other. The currents returning from the end users to the supply transformer all share the neutral wire (neutral point 505). If the loads are evenly distributed on all three phases, as they are in FIG. 5A, the sum of the returning currents in the neutral wire is approximately zero. Any unbalanced phase loading such as in FIG. 5B, however, may result in a current 606 at the neutral point, which may cause inefficient use of transformers, vibrations in generators, or other problems, including (but not limited to) brown-outs or black-outs in extreme cases. There are many factors that may create imbalance between the phases, such as excess load usage, downed power lines, etc.

As noted above, devices in a PLC network may communicate information, such as metering data, to other devices in the network over one or more electrical phases. One link technology for smart grid AMI networks is defined in the IEEE 1901.2 PLC protocol. IEEE 1901.2 specifies an orthogonal frequency division multiplexing (OFDM) physical layer that increases overall throughput and robustness across a noisy and unpredictable medium. Using such a protocol, a device on the power grid (e.g., a field area router or the like) that is connected to all three electric power phases may communicate on all three phases simultaneously, to increase the amount of data that can be transmitted at any given time.

Government regulations may dictate the frequency ranges and/or power levels that can be used by a PLC device when transmitting a message. For example, the Federal Communications Commission (FCC) in the United States and the European Committee for Electrotechnical Standardization (CENELEC) are responsible for promulgating communication regulations for their respective jurisdictions. In Europe, CENELEC has allocated the CENELEC A band (3 kHz-95 kHz) for use with energy providers in Europe and has specified the allowable output power limits within the frequency band. In particular, CENELEC allows a maximum output power for devices transmitting on a single phase in the CENELAC A band that is higher than the maximum output power for devices transmitting on multiple phases simultaneously in the band.

Notably, a tradeoff exists in a PLC network between the use of a single power phase with a higher output power for transmissions and the use of multiple power phases with lower output powers for transmissions. In particular, a PLC device may exhibit a higher data rate using multiple power phases simultaneously, but at the expense of the transmission range of the device. In general, a larger communication range allows for more robust links, lower communication latency, and overall better network performance. Furthermore, applying PLC technology to more rural environments becomes challenging where the distance between PLC endpoints is relatively large.

Phase Selection for PLC Links

The techniques herein allow a single PLC device communicate across multiple electrical distribution phases. In one aspect, the PLC device may be configured to dynamically choose which phase(s) to transmit on. In another aspect, a packet transmitted on a PLC network may include information about what phase(s) the packet is being transmitted on within the packet itself. In a further aspect, a PLC device may communicate information about what power phases the device is connected to. In yet another aspect, an Adaptive Tone Mapping process may be modified to evaluate link/signal quality when transmitting on different phases. In another aspect, a PLC device may choose which phase to send packets to another device, based on the Adaptive Tone Mapping results. In an additional aspect, a PLC device may modify its broadcast behavior to transmit on a single phase when range is important (e.g., for device discovery packets, etc.) and on multiple phases when efficiency is important (e.g., for flood/dissemination packets, etc.).

Specifically, according to one or more embodiments of the disclosure as described in detail below, a device receives connected phase data from a neighboring device indicative of one or more electrical phases to which the neighboring device is connected. A determination is made, based on the connected phase data for the neighboring device, whether to transmit the message to the neighboring device over a single electrical phase at a higher output power or over a plurality of electrical phases at a lower output power. The message is then transmitted to the neighboring device over the determined one or more electrical phases.

Illustratively, the techniques described herein may be performed by hardware, software, and/or firmware, such as in accordance with PLC process 248, which may contain computer executable instructions executed by the processor 220 to perform functions relating to the novel techniques described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Figure 6:
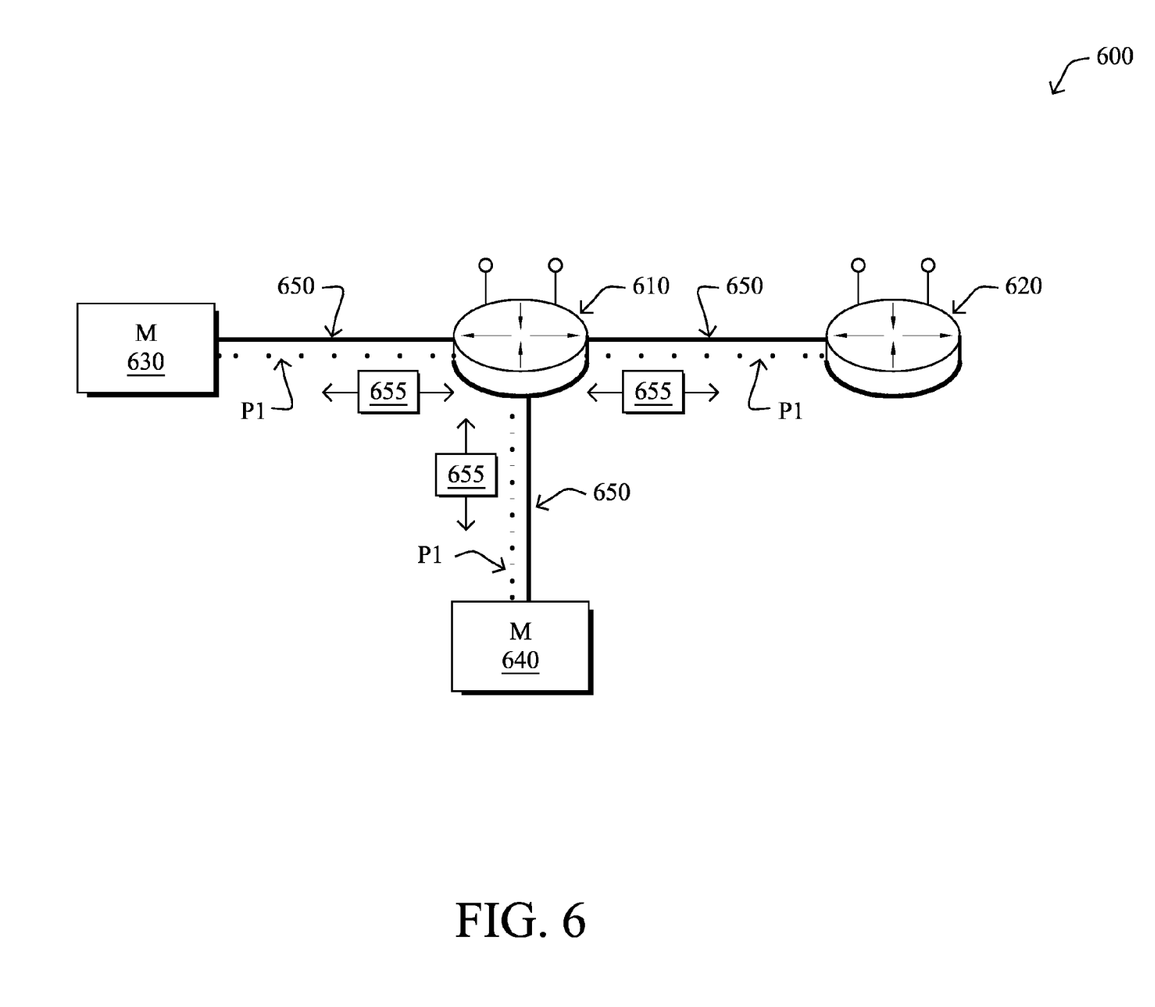
FIGS. 6-8 illustrate a simplified example of PLC messages sent on different electrical phases.
Figure 7:
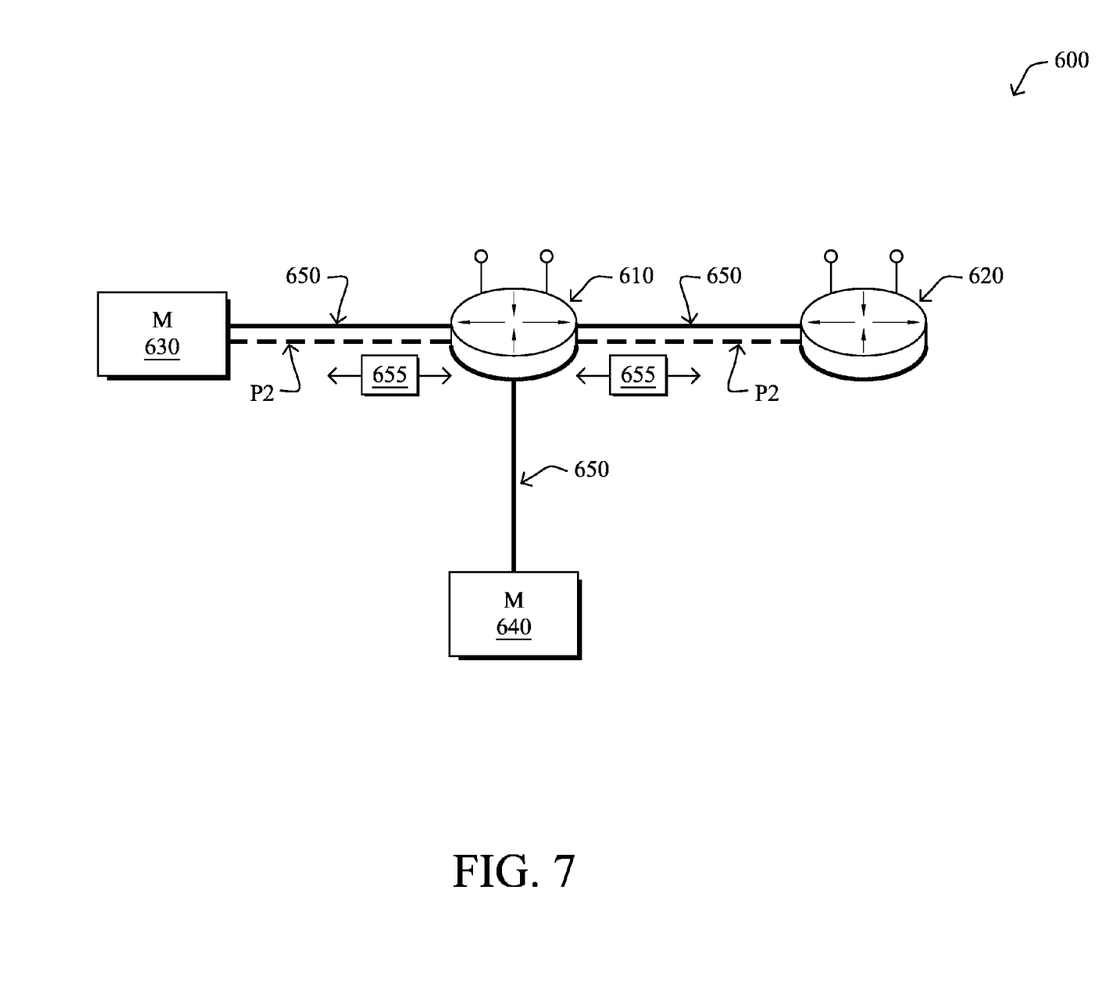
Figure 8:
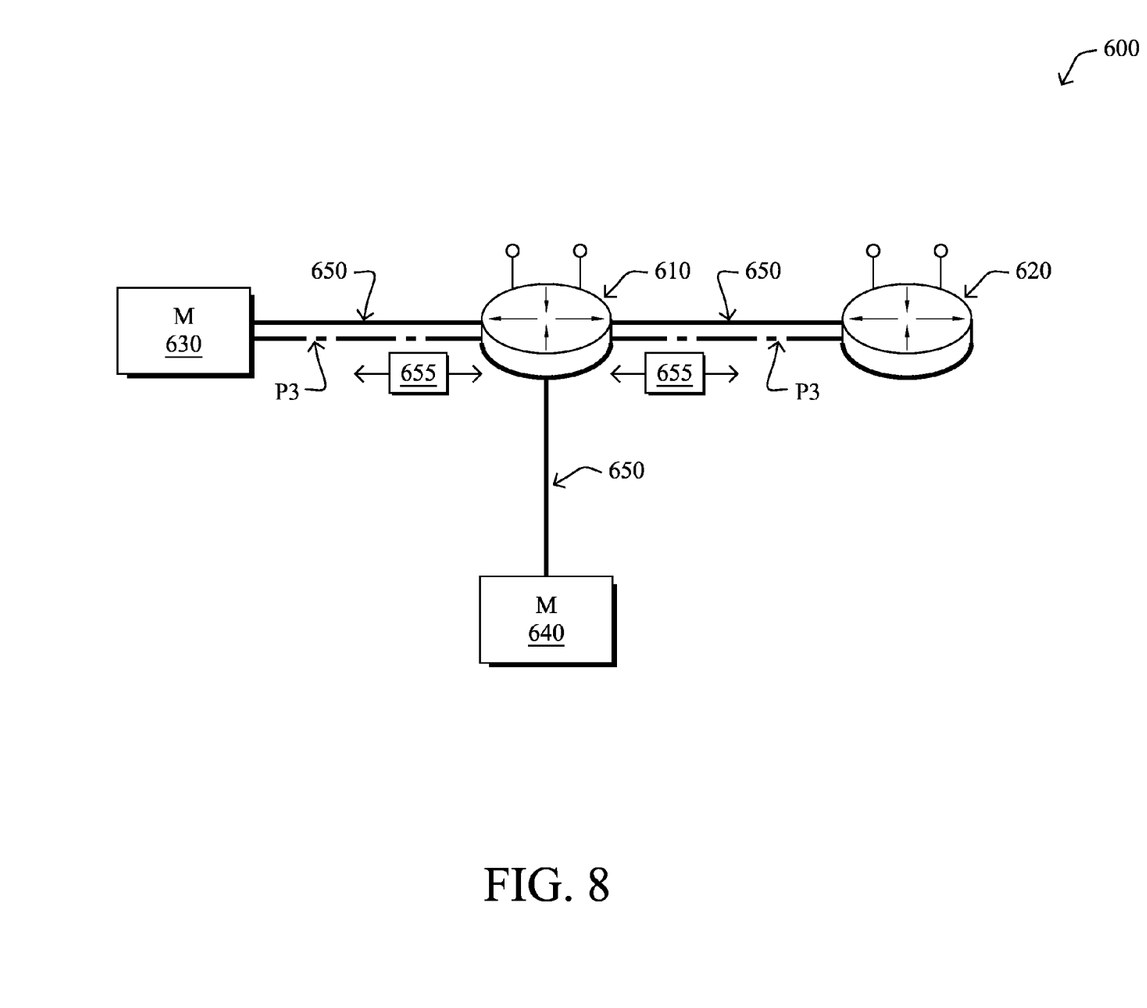

Operationally, FIGS. 6-8 illustrate a simplified example of PLC messages that are sent on different power phases. In particular, a PLC network, such as network 100, may include set of network devices 600 that are configured to receive and/or transmit data between one another using communication links 650 (e.g., power lines 160). As shown, network devices 600 may include routers, such as routers 610, 620, smart meters 630, 640, or any other device configured to communicate on the PLC network. As will be appreciated by one skilled in the art, the specific devices and network topology depicted in FIGS. 6-8 are illustrative only, and that the techniques described herein can be applied to any number of different combinations of devices and network topologies.

In FIG. 6, network devices 600 may exchange messages 655 on a particular phase P1 of power delivered by the electric grid. For example, router 610 may receive and/or transmit messages 655 to or from any of smart meters 630, 640 and router 650 on phase P1. In many cases, a message 655 may be transmitted on phase P1 by one device and received by a different device via the same power phase P1. However, this is not always the case. In particular, a network device may receive a message 655 on one phase that was originally transmitted on a different electrical phase, due to cross-talk effects.

Each of network devices 600 may comprise an interface that can dynamically transmit/receive on each connected phase individually. In other words, the interface allows the network device to switch between different electrical distribution phases or transmit/receive signals on multiple phases simultaneously. As shown in FIGS. 7-8, for example, some of network devices 600 may transmit and/or receive messages 655 on other electrical phases P2 and P3, in addition to that of phase P1. For example, messages 655 may be communicated between routers 610, 620 or between router 610 and meter 630, on all three of phases P1-P3. However, messages 655 may only be communicated between router 610 and meter 640 on phase P1. In some cases, this may be because meter 640 only receives power on phase P1. In other cases, meter 640 and/or router 610 may determine that messages 655 are to be communicated between the two devices only on phase P1.

In one embodiment, a device in network devices 600 may include a network interface having a single front-end module multiplexed across the different electrical distribution phases (e.g., some or all of phases P1-P3). In another embodiment, such an interface may include a single front-end module for each connected electrical distribution phase (e.g., a separate front-end module for each of phases P1-P3).

Figure 9:
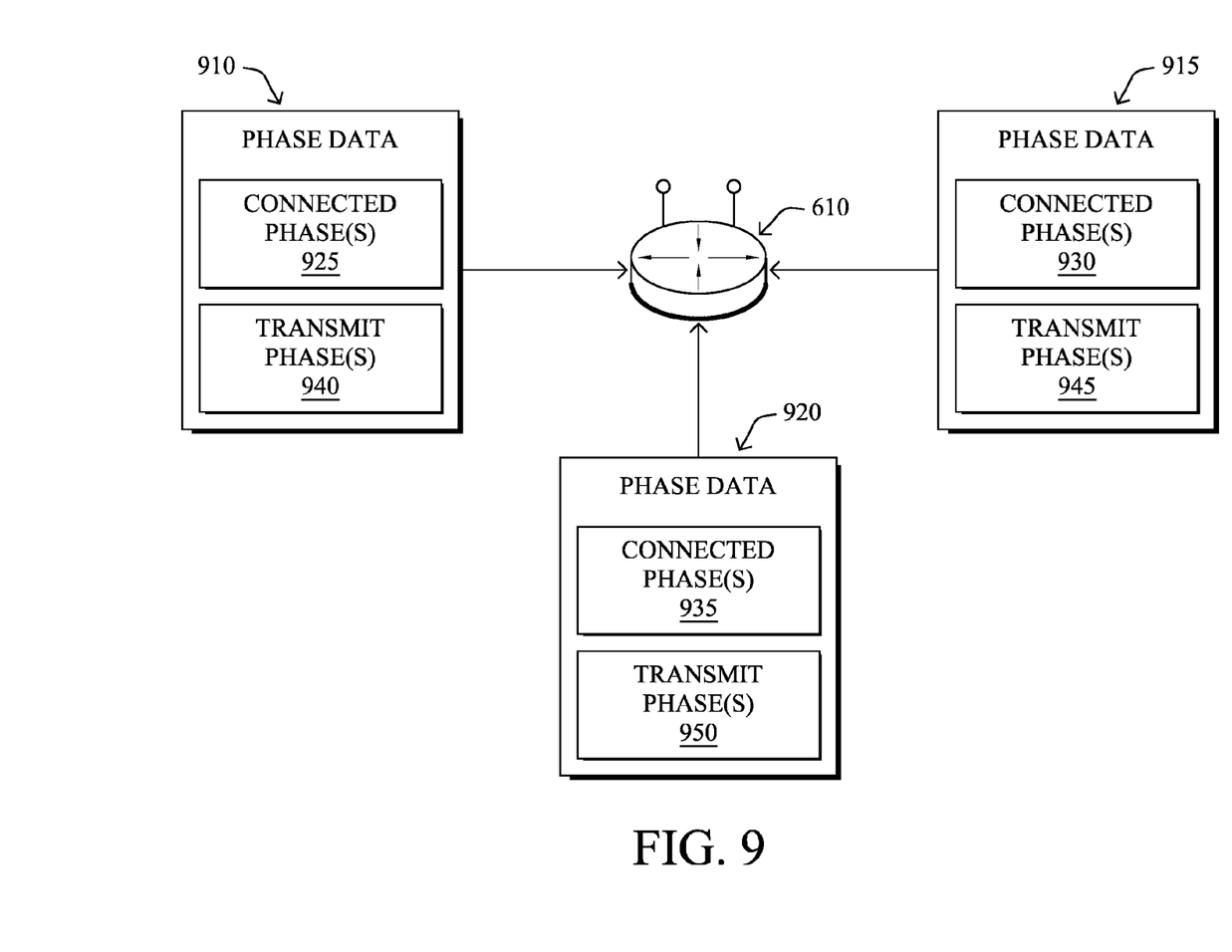
FIG. 9 illustrates an example device/node receiving phase data from neighboring devices.

Referring now to FIG. 9, an illustration is shown of an example device/node (e.g., router 610 or another PLC device) receiving phase data from neighboring devices. For example, router 610 may receive phase data 910, 915, and 920 from meter 630, router 620, and meter 640, respectively. Phase data 910 may be received as part of a message packet (e.g., a packet of a message 655), in one embodiment. For example, phase data 910 may be included in a payload message communicated to router 610, in a device discovery message communicated to router 610, in a tone mapping message communicated to router 610, etc. In other embodiments, phase data 910 may be sent to router 610 as its own individual message. For example, phase data 910 may be provided to router 610 as part of a polling mechanism (e.g., in response to router 610 specifically requesting phase data from another device) or as part of a push mechanism in which another device automatically provides phase data to router 610 without router 610 first requesting the data.

In one embodiment, phase data 910, 915, and 920 include data 925, 930, and 935, respectively, regarding the electrical phases to which their originating devices are connected. For example, data 930 in phase data 915 received from router 620 may indicate that router 620 is interfaced with all three electrical phases (e.g., phases P1-P3). In another example, data 935 received from meter 920 may specify that meter 920 is only interfaced with phase P1 of the power system. Communicating information about what phases the device is connected to gives the receiver information on what phases are likely to provide the best quality when sending packets in the reverse direction.

In various embodiments, phase data received by a network device may include data regarding the one or more electrical phases on which the phase data was transmitted. For example, phase data 910, 915, and 920 may include transmit phase data 940, 945, and 950, respectively, that indicate the phases on which their respective devices transmitted the phase data. For example, phase data 915 received from router 620 may include transmit phase data 945 that indicates that phase data 915 was transmitted over all three phases P1-P3. In another example, phase data 920 received from meter 640 may indicate that phase data 920 was transmitted over a single phase, P1. In one embodiment, the received packet may include a phase identifier in the transmit phase data that indicates what phase the device is transmitting on. In another embodiment, the transmit phase data may include a time-delay since the last zero-crossing of the power. Both embodiments allow the receiving device to determine whether or not the transmission is occurring on the same phase or on a different phase than the phase on which the transmission was received (i.e., whether or not cross-talk effects are present). When using 1901.2 with IEEE 802.15.4e framing, in one embodiment, phase data may also be encoded in an Information Element.

Figure 10:
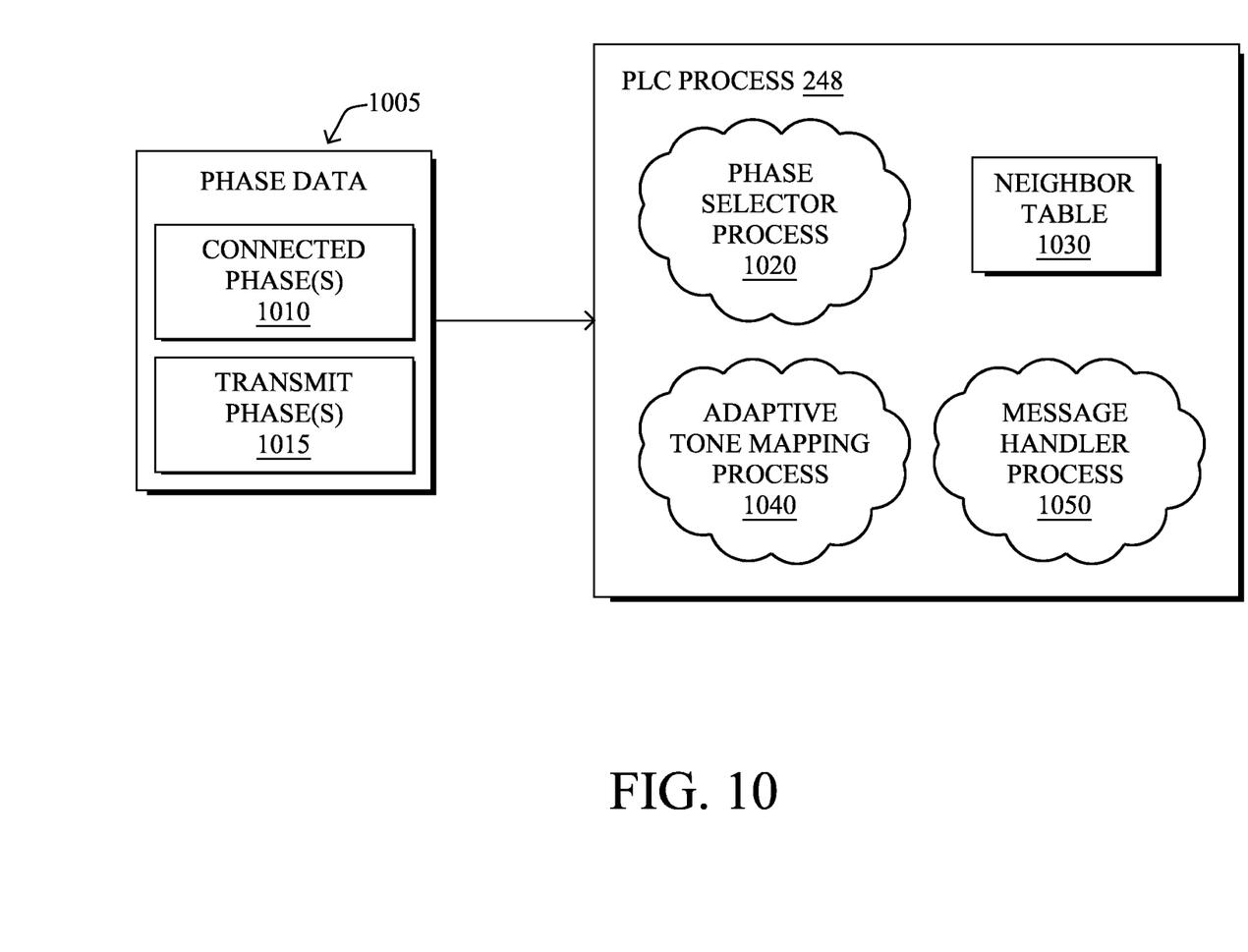
FIG. 10 illustrates an example of the PLC process of FIG. 2 in greater detail.

FIG. 10 illustrates an example of the PLC process of FIG. 2 in greater detail, according to one embodiment. As discussed previously, PLC process 248 is generally configured to process received PLC messages and/or to transmit messages on the PLC network. Accordingly, PLC process 248 may include a message handler process 1050 that handles the reception of messages and/or the transmission of messages on the PLC network. For example, message handler process 1050 may handle the reception and/or transmission of messages used to discover other devices in the network. In another example, message handler process 1050 may relay a received message between other devices on the network.

According to various embodiments, PLC process 248 uses phase data 1005 received from a neighboring device to select one or more electrical phases over which PLC process 248 is to communicate with the neighboring device. PLC process 248 may store connected phase data 1010 (i.e., the phases to which the neighboring device is connected) and/or transmitted phase data 1015 (i.e., the one or more phases over which phase data 1005 was sent) within a neighbor table 1030. For example, neighbor table 1030 may associate received phase data with a device identifier for the network device that sent the phase data.

PLC process 248 may, in some embodiments, include an adaptive tone mapping process 1040. Adaptive tone mapping process 1040 is generally configured to implement Adaptive Tone Mapping, a process that dynamically selects which subcarriers and coding parameters are used when transmitting a data frame. The goal of Adaptive Tone Mapping is to maximize throughput and minimize channel utilization by only transmitting on usable subcarriers and optimizing the code-rate without sacrificing robustness.

In one embodiment, adaptive tone mapping process 1040 is configured to send a Tone Map Request (TMREQ) to a neighboring device, in according with IEEE 1901.2, HomePlug, or other such standard. For example, process 1040 may send a TMREQ on each phase connected to the device executing PLC process 248. In another embodiment, the TMREQ may be sent by process 1040 on only those phases that both the sender/receiver are connected to (thus limiting the number of TMREQ transmissions that need to be sent). For example, adaptive tone mapping process 1040 may reference the connected phases of a neighboring device in neighbor table 1030, to determine on which phases the TMREQ is to be transmitted.

A Tone Map Reply (TMREP) may be sent to PLC process 248 by the receiving device in response to each TMREQ, or a single TMREP may be sent in aggregate, in various cases. Similarly, process 1040 may be configured to generate and transmit an individual or aggregate TMREP to another device that sent a TMREQ. In various embodiments, a TMREP or TMREQ received and/or transmitted by PLC process 248 includes phase data. For example, in some embodiment, phase data 1005 is included within a TMREQ packet received from another device on the network. Such phase information included in a TMREQ packet may be used to identify each result in a corresponding TMREP.

Upon receiving a TMREP, the PLC process 248 may store results for each phase individually or store only the best results along with the best phase in neighbor table 1030 (i.e., the phase(s) on which a TMREP has the highest signal quality). In some cases, a device may also send TMREQ messages on multiple phase(s) simultaneously. While this case requires reduced output power (e.g., due to regulatory constraints or other factors), there may be cases where sending on multiple phases with reduced output power may provide more robust communication than sending on a single phase with higher output power.

In various embodiments, PLC process 248 includes a phase selector process 1020 that selects one or more phases on which a message is to be transmitted by message handler process 1050. In one embodiment, phase selector process 1020 uses the phase data stored in the modified neighbor table 1030 to choose the one or more phases. In one embodiment, neighbor table 1030 simply maintains the "connected phases" information for the neighboring devices (e.g., connected phase data 1010). For example, connected phase data 1010 may be stored in neighbor table 1030 and associated with the device that transmitted phase data 1005. In another embodiment, neighbor table 1030 may include the TMREP information across different transmission phases. For example, the cross-talk effects may be stronger when transmitting on one phase compared to another. When transmitting a packet, phase selector process 1020 may chooses the phase that provides the best link quality based on information in neighbor table 1030 (e.g., the one or more phases having the highest associated signal quality). When re-transmitting a packet, phase selector process 1020 may choose phases that have slightly lower link quality in case the previous transmission failed due to transient effects.

Phase selector process 1020 generally enables the broadcast behavior of a poly-phase PLC interface to be modified. In one embodiment, the device may transmit multiple times (once on each phase), as determined by phase selector process 1020. In another embodiment, the device may transmit only once (on a phase randomly chosen with each transmission or on a different phase relative to previous transmissions), as selected by phase selector process 1020. The choice between the different strategies by phase selector process 1020 may be driven by higher-layer information (i.e. packet priority, packet type, etc.). For example, IEEE 802.15.4 Enhanced Beacons used to discover neighboring devices may be transmitted on randomly chosen phases regulated by a Trickle timer. In another example, IEEE 802.15.4 Enhanced Beacon Requests may be sent across all phases back-to-back to minimize the time of soliciting an Enhanced Beacon from a neighboring device.

In many cases, the decision between transmitting a message on a single phase or on multiple phases by phase selector process 1020 may affect the output power limits used by the PLC device executing PLC process 248. For example, as noted above, regulatory constraints and other factors may be such that the output power limit for a poly-phase transmission must be lower than the output power limit for a single-phase transmission. Thus, in various embodiments, phase selector process 1020 may dynamically choose on which phase or phases a given message from message handler process 1050 will be sent. In some cases, phase selector process 1020 may determine that transmitting on a single phase with higher output power may provide the most robust transmission strategy. In other cases, phase selector process 1020 may determine that transmitting on multiple phases simultaneously may provide more reliable communication even though output power is reduced. In addition to determining whether to transmit on a single phase or multiple phases simultaneously, phase selector process 1020 may determine on which particular phase(s) the transmission is to be sent. For example, phase selector process 1020 may determine that only a single phase should be used and that phase P1, in particular, offers the best signal quality.

In some embodiments, phase selector process 1020 may choose to transmit on a single phase or on multiple phases based on the kind of broadcast packet to be sent. In other words, phase selector process 1020 may select one or more phases for transmission based on a type of message to be sent, as determined by message handler process 1050. For example, in the case of message handler process 1050 transmitting a device discovery message, phase selector process 1020 may determine that sending the message on a single phase may be beneficial to maximize range and discover as many "1-hop" neighbors as possible, thus reducing the number of hops in the network, communication latency, etc. In another example, in the case of message handler process 1050 sending a broadcast packet (e.g., as part of a flood/dissemination protocol), phase selector process 1020 may determine that it is more efficient to send a single transmission on all available phases simultaneously, than by relying on re-transmissions from neighboring devices to continue the propagation.

For purposes of device discovery, in particular, the transmit phase data and connected phase data for a device in neighbor table 1030 may be used to speed up the discovery process. A quick discovery process often consists of receiving a discovery message from a neighboring device and determining whether or not it is worth starting a negotiation process with that neighbor. When a discovery packet is sent on a phase that the receiver is not connected to, the receiver may still receive the packet but with additional attenuation due to cross-talk. Using the "connected phases" information in neighbor table 1030, phase selector process 1020 can determine that while the discovery message was received with low signal quality, the link may be good enough when transmitting on the same phase. In other words, in one embodiment, phase selector process 1020 may select one or more phases to make use of the cross talk effects.

Figure 11:
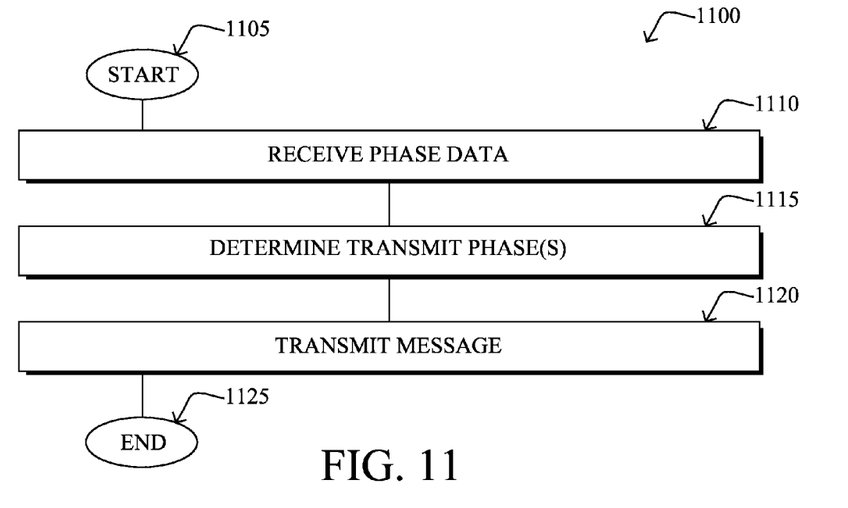
FIG. 11 illustrates an example procedure for selecting communication power phase(s)

FIG. 11 illustrates an example simplified procedure for selecting one or more electrical phases for communication, in accordance with one or more embodiments described herein from the perspective of the transmitting device (e.g., PLC node/device 200). The procedure 1100 starts at step 1105, and continues to step 1110, where, as described in greater detail above, phase data is received from a neighboring device. In one embodiment, the phase data includes data indicative of the one or more phases to which the neighboring device is connected. In further embodiments, the phase data may also include data regarding which phase or phases on which the phase data was transmitted. As described above in greater detail, the phase data may be part of a tone map request or reply, may be included in a message sent via the network (e.g., an AMI message, a status message, etc.), and/or may be sent on either a pull or push basis. For example, as shown in greater detail in FIG. 12, the phase data may be received as part of a tone map reply sent in response to a tone map request.

The receiving device may then in step 1115 determine whether to send a message to the neighboring device associated with the received phase data over a single electrical phase or over multiple phases. In one embodiment, the determination is based in part on differing power levels allowed for a single phase transmission and a poly-phase transmission (e.g., whether to send a message over a single phase at a higher output power or over multiple phases with a lower output power). In various cases, the particular one or more phases may be selected randomly or deliberately (e.g., based on a determination that the selected phase or phases provide the best connection between the devices, etc.). Various factors may be used to make the determination in step 1115. In one embodiment, as shown in greater detail in FIG. 13, the type of message to be sent may be used to select the transmittal phase or phases. Further factors that may be used to select the transmittal phase or phases may include the phase(s) to which the neighboring device is connected and/or one or more phases over which the neighboring device does not transmit (e.g., if cross-talk effects are such that the selected phase or phases are still the optimal selection), according to various embodiments.

Procedure 1100 continues on to step 1120 in which a message is then transmitted over the one or more electrical phases determined in step 1115. Procedure 1100 then ends in step 1125 after the message has been transmitted on the one or more electrical phases determined in step 1115.

Figure 12:
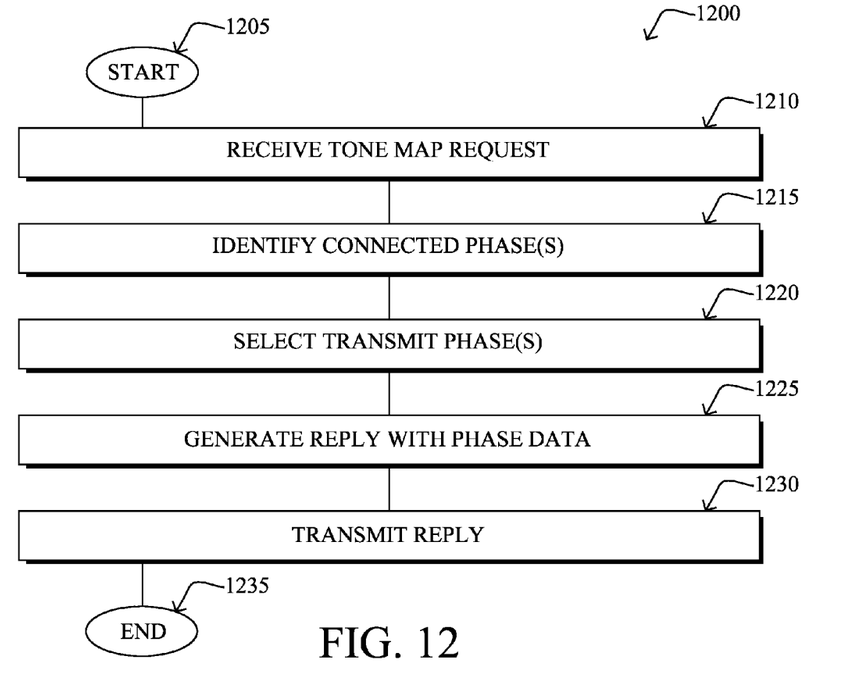
FIG. 12 illustrates an example procedure for including phase data with a tone map reply.

FIG. 12 illustrates an example simplified procedure for including phase data with a tone map reply, in accordance with embodiments described herein from the perspective of a PLC node/device (e.g., PLC device 200). Procedure 1200 begins at step 1205 and continues on to step 1210 in which a tone map request (TMREQ) is received by a device. In response to the request, the one or more phases connected to the receiving device are identified in step 1215. For example, the device may be connected to a single electrical phase or multiple electrical phases, depending on the location of the device in the electrical distribution network and on the configuration of the power grid. In step 1220, the device that received the TMREQ selects one or more electrical phases over which a reply is to be sent. The phases may be selected, for example, based on the phases connected to the device, the phase(s) on which the TMREQ was sent or received, or on other such factors. Procedure 1200 continues on to step 1225 in which a tone map reply (TMREP) is generated with phase data. In one embodiment, the information regarding which phases are connected to the device as determined in step 1215 may be included in the TMREP. In further embodiments, the TMREP may include information regarding on which phase(s) were selected to transmit the TMREP. In step 1230, the TMREP is then transmitted on the one or more phases selected in step 1220 to the source of the TMREQ. Procedure 1200 then ends in step 1235.

Figure 13:
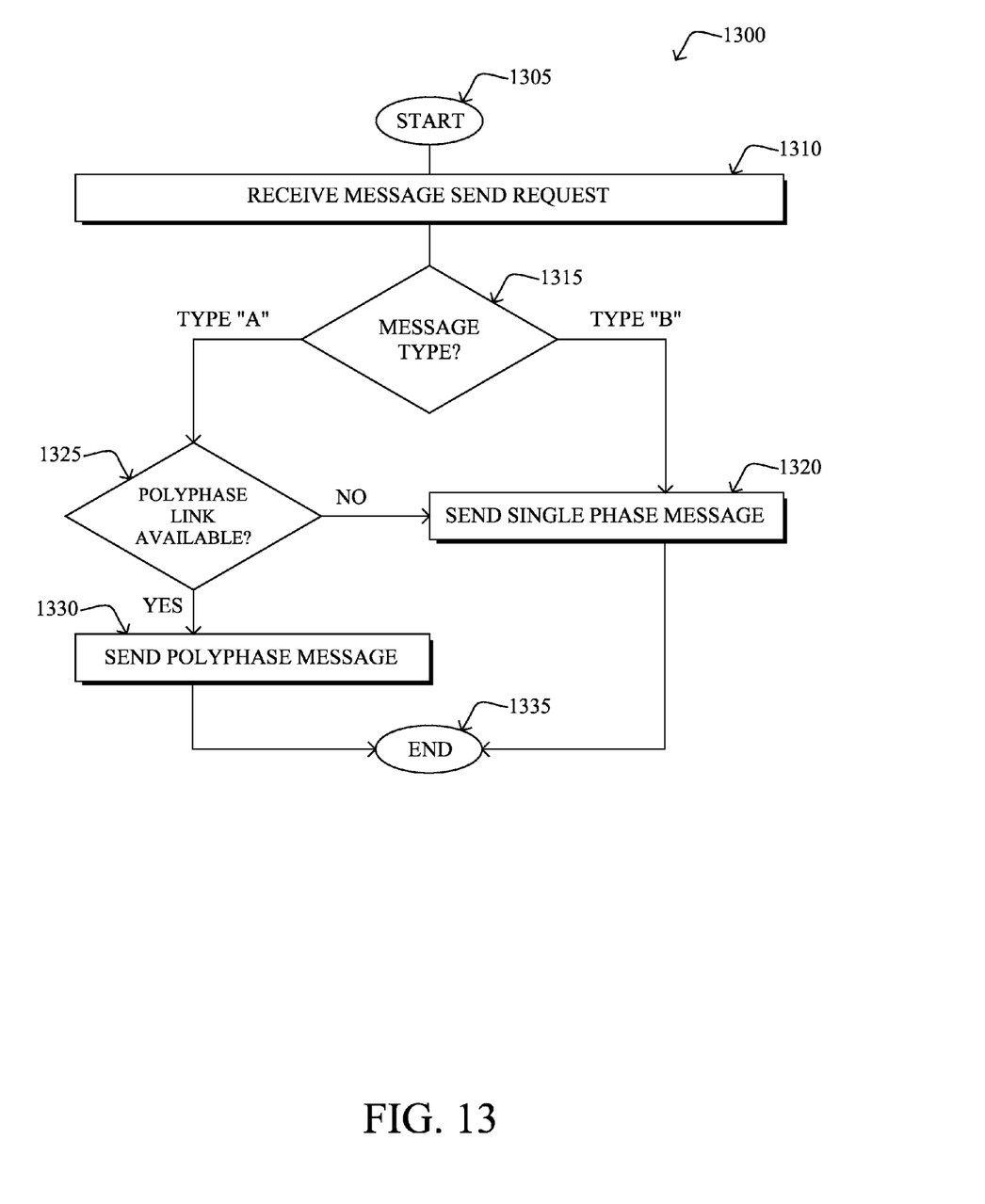
FIG. 13 illustrates an example procedure for selecting communication power phase(s) based on a message type.

FIG. 13 illustrates an example simplified procedure for selecting communication electrical phase(s) based on a message type, in accordance with one or more embodiments described herein from the perspective of a PLC node/device (e.g., PLC device 200). Procedure 1300 begins at step 1305 and proceeds to step 1310 in which a message send request is received. In step 1315, a decision is made that tests the type of the message, prior to transmission. As shown in FIG. 13, for example, a message may be of either type 'A' or 'B.' If the message is of type 'B,' procedure 1300 continues on to step 1320 in which the message is sent over a single electrical phase and ends at step 1335. However, if the message is of type 'A,' procedure 1300 continues on to step 1330 in which another decision is made at step 1325 to determine whether a polyphase link exists between the device and the destination device. If not, procedure 1300 continues on to step 1320 and the message is sent over a single phase. However, if a polyphase link is available between the devices, procedure 1300 continues on to step 1330 in which the message is sent over the polyphase link and then ends at step 1335. As will be appreciated by one skilled in the art, procedure 1300 is illustrative and could be modified to support any number of message types by duplicating steps 1320-1330, accordingly.

It should be noted that while certain steps within procedures 1100-1300 may be optional as described above, the steps shown in FIG. 11 through FIG. 13 are merely examples for illustration, and certain steps may be included or excluded as desired. Further, while procedures 1100-1300 are described separately, certain steps from each procedure may be incorporated into each other procedure, and the procedures are not meant to be mutually exclusive.

The techniques described herein, therefore, provide a method for having a PLC interface that is connected to multiple phases selectively transmit on a single phase at a time. Doing so maximizes the communication range, increases reliability, lowers latency, and improves overall network performance. By transmitting only on a single phase at a time, reduced output power limits defined by regulatory agencies also no longer apply (e.g., such as in the CENELEC A band).

In addition, the techniques herein provide a PLC-based solution that allows a device connected to multiple electrical phases to dynamically choose one or more phases on which a message is to be sent. In one embodiment, the decision may be based on the actual type of message to be sent. The techniques herein also provide for mechanisms by which phase information is communicated between devices (e.g., which phase(s) are connected to the sending device, over which phase(s) the messages were transmitted, etc.), allowing a network device to select an optimal phase or set of phases over which to send a message. In some embodiments, the techniques described herein may be applied to an Adaptive Tone Mapping process, allowing a device to evaluate link quality when transmitting on different phases and use this analysis to select one or more phases to transmit a message.

While there have been shown and described illustrative embodiments that provide for phase selecting to communicate in a polyphase electric system, it is to be understood that various other adaptations and modifications may be made within the spirit and scope of the embodiments herein. For example, the embodiments have been shown and described herein with relation to particular communication protocols. However, the embodiments in their broader sense are not as limited, and may, in fact, be used with other types of networks and/or protocols. Also, while the embodiments above generally describe the polyphase source system as a three-phase system, this is merely one example embodiment of a polyphase system (granted, the most prevalent type today), and is not meant to limit the embodiments herein. In addition, as noted above, while the techniques above may be made reference to transmission systems or distribution systems, however the disclosure herein applies to both the transmission and distribution portions of the electric grid, where applicable.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, connected phase data from a neighboring device indicative of one or more electrical phases to which the neighboring device is connected;
   updating, at the device, a stored neighbor table with the connected phase data received from the neighboring device;
   determining, using the stored neighbor table stored on the device, whether to transmit a message to the neighboring device over a single electrical phase at a higher output power or over a plurality of electrical phases at a lower output power; and
   transmitting the message to the neighboring device over the determined one or more electrical phases.

2. The method as in claim 1, further comprising:
   receiving transmission phase data from the neighboring device indicative of the one or more electrical phases over which the transmission phase data was sent.

3. The method as in claim 2, wherein the transmission phase data comprises one or more phase identifiers that represent the one or more electrical phases over which the transmission phase data was sent.

4. The method as in claim 2, wherein the transmission phase data comprises a time-delay value relative to the last zero crossing of an electrical phase.

5. The method as in claim 2, wherein the connected phase data and the transmission phase data are received as part of a tone map reply message.

6. The method as in claim 2, further comprising:
identifying that the transmission phase data was transmitted over an electrical phase to which the device is not connected and was received by the device due to crosstalk; and
determining that the neighboring device can receive the message if the message is transmitted over an electrical phase used by both the device and the neighboring device.

7. The method as in claim 2, further comprising:
analyzing a signal quality of the transmission phase data.

8. The method as in claim 1, further comprising:
transmitting, over each of the plurality of electrical phases, a tone map request.

9. The method as in claim 1, wherein determining whether to transmit the message over the single electrical phase or over the plurality of electrical phases is based in part on transmission criteria that comprise at least one of a packet priority or packet type.

10. The method as in claim 1, further comprising:
receiving a tone map request;
identifying one or more electrical phases connected to the device;
selecting one or more electrical phases to transmit a tone map reply;
generating the tone map reply, the tone map reply comprising data indicative of the one or more phases connected to the device and the one or more electrical phases selected to transmit the reply; and
transmitting the tone map reply over the selected one or more phases.

11. An apparatus comprising:
one or more network interfaces configured to communicate in a power line network;
a processor configured to execute one or more processes; and
a memory configured to store a process executable by the processor, the process when executed operable to:
receive connected phase data from a neighboring device indicative of one or more electrical phases to which the neighboring device is connected;
update a stored neighbor table with the connected phase data received from the neighboring device;
determine, using the stored neighbor table, whether to transmit a message to the neighboring device over a single electrical phase at a higher output power or over a plurality of electrical phases at a lower output power; and
transmit the message to the neighboring device over the determined one or more electrical phases.

12. The apparatus as in claim 11, comprising a network interface adapted to communicate over a plurality of electrical phases.

13. The apparatus as in claim 12, wherein the process when executed is operable to:
analyze a signal quality of the transmission phase data.

14. The apparatus as in claim 11, comprising a plurality of network interfaces, each network interface in the plurality adapted to communicate over a single electrical phase.

15. The apparatus as in claim 14, wherein the connected phase data and the transmission phase data are received as part of a tone map reply message.

16. The apparatus as in claim 11, wherein the process when executed is operable to:
receive transmission phase data from the neighboring device indicative of the one or more electrical phases over which the transmission phase data was sent.

17. The apparatus as in claim 11, wherein the process when executed is operable to:
update a stored neighbor table with the connected phase data received from the neighboring device; and
use the stored neighbor table to determine whether to transmit the message to the neighboring device over the single electrical phase or over the plurality of electrical phases.

18. The apparatus as in claim 11, wherein determining whether to transmit the message over the single electrical phase or over the plurality of electrical phases is based in part on transmission criteria that comprise at least one of a packet priority or packet type.

19. A tangible, non-transitory, computer-readable media having software encoded thereon, the software, when executed by a processor, operable to:
receive connected phase data from a neighboring device indicative of one or more electrical phases to which the neighboring device is connected;
update a stored neighbor table with the connected phase data received from the neighboring device:
determine, using the stored neighbor table, whether to transmit a message to the neighboring device over a single electrical phase at a higher output power or over a plurality of electrical phases at a lower output power; and
transmit the message to the neighboring device over the determined one or more electrical phases.

* * * * *